July 4, 1972  H. W. KOGELNIK  3,674,336
LIGHT WAVE COUPLING INTO THIN FILM LIGHT GUIDES
WITH BRAGG TYPE GRATINGS
Filed Aug. 28, 1970

INVENTOR
*H. W. KOGELNIK*
BY *David P. Kelley*
ATTORNEY 3,674,336
LIGHT WAVE COUPLING INTO THIN FILM LIGHT GUIDES WITH BRAGG TYPE GRATINGS
Herwig Werner Kogelnik, Fair Haven, N.J., assignor to Bell Telephone Laboratories, Incorporated, Murray Hill, N.J.
Filed Aug. 28, 1970, Ser. No. 67,857
Int. Cl. G02b 5/14, 5/18
U.S. Cl. 350—96 WG
5 Claims

ABSTRACT OF THE DISCLOSURE

Light coupling into thin optical waveguiding films is achieved by means of a thick Bragg type diffraction grating extending along one surface of the film. When the light is incident at or near the Bragg angle, unwanted diffraction orders are suppressed and efficient coupling is realized.

BACKGROUND OF THE INVENTION

This invention relates to methods and apparatus for coupling light waves into thin film light guides.

The adaptation of circuit integration techniques to optical frequency ranges for use in optical communication systems, optical data processing, and other optical systems has been the subject of considerable interest and investigation. The advantages of integrated circuits in the optical range are equivalent to the advantages of such arrangements at lower frequencies. Miniaturization, minimization of ambient effects such as vibration and thermal effects, and reproducibility at low cost are all desiderata realizable with integrated optical circuitry.

A basic building block for integrated optical circuitry is the thin film light guide, wherein the film is generally of a thickness approximating the wavelength of the light to be transmitted. The thinness of the film, however, makes it quite difficult to introduce light into the film with any relevant degree of efficiency.

In a copending U.S. patent application, Ser. No. 793,696 of P. K. Tien, filed Jan. 24, 1969, now Patent No. 3,584,230, and assigned to the assignee of the present application, there is disclosed an arrangement utilizing an internally reflecting prism for coupling light waves into the thin film through a major surface thereof. The prism coupling has proven to be far more efficient than prior arrangements such as those wherein the light is introduced into the guide through one end thereof. On the other hand the prism arrangement is, relatively speaking, somewhat bulky, and reduction of this bulk would enable further miniaturization of the system. Thus an arrangement which accomplishes a decrease in bulk or size and insures high coupling efficiency is desirable. One such arrangement, with several variations, is disclosed in U.S. patent application Ser. No. 40,079 of A. Ashlin and E. P. Ippen, filed May 25, 1970, and assigned to the assignee of the present application. The arrangements shown in that application couple light into an optical waveguide by means of an optical grating disposed along one surface of the guide. The degree of coupling can be varied by variations in the angle of incidence of the light to be coupled.

In general, an efficient grating coupler should satisfy certain basic requirements and the overall efficiency of the coupler will depend upon the degree to which these requirements are met. One requirement for high efficiency is the use of lossless and scatter free materials, which can be met through the use of dielectric or phase gratings. Another requirement is that unwanted grating orders be suppressed. One way of satisfying this requirement is through the use of extremely fine gratings, the greater the number of grating lines per millimeter in the grating, the closer this requirement comes to being met. However, with conventional grating manufacturing techniques, there are limits on the number of lines that can be formed. Finally, there must be a sufficiently deep spatial modulation of the optical phase shift to produce strong coupling in relatively short coupling lengths.

SUMMARY OF THE INVENTION

The present invention is a grating coupler which satisfies each of the aforementioned requirements for high efficiency to a high degree, thereby giving high efficiency coupling of light into (and out of) the thin film waveguide.

In an illustrative embodiment of the invention, a layer of material such as dichromated gelatin is deposited directly onto the thin film waveguide, and a thick diffraction grating is formed holographically therein characterized by a plurality of Bragg planes at an angle to the surface of the waveguide. A thick grating is one where the thickness times the wavelength of the light is equal to or greater than the grating period. Light incident on the grating at or near the Bragg angle is coupled into the waveguide with a high degree of efficiency over a relatively short coupling length and with substantially complete suppression of unwanted modes, so that most of the light energy is in the mode that couples to the guide. The Bragg condition is met when the light incident upon the Bragg planes is such that diffraction from the planes is maximized. This is a function of both wavelength and angle of incidence.

The various features of the present invention will be more readily apparent from the following detailed description, read in conjunction with the accompanying drawings.

DETAILED DESCRIPTION

Figure 1:
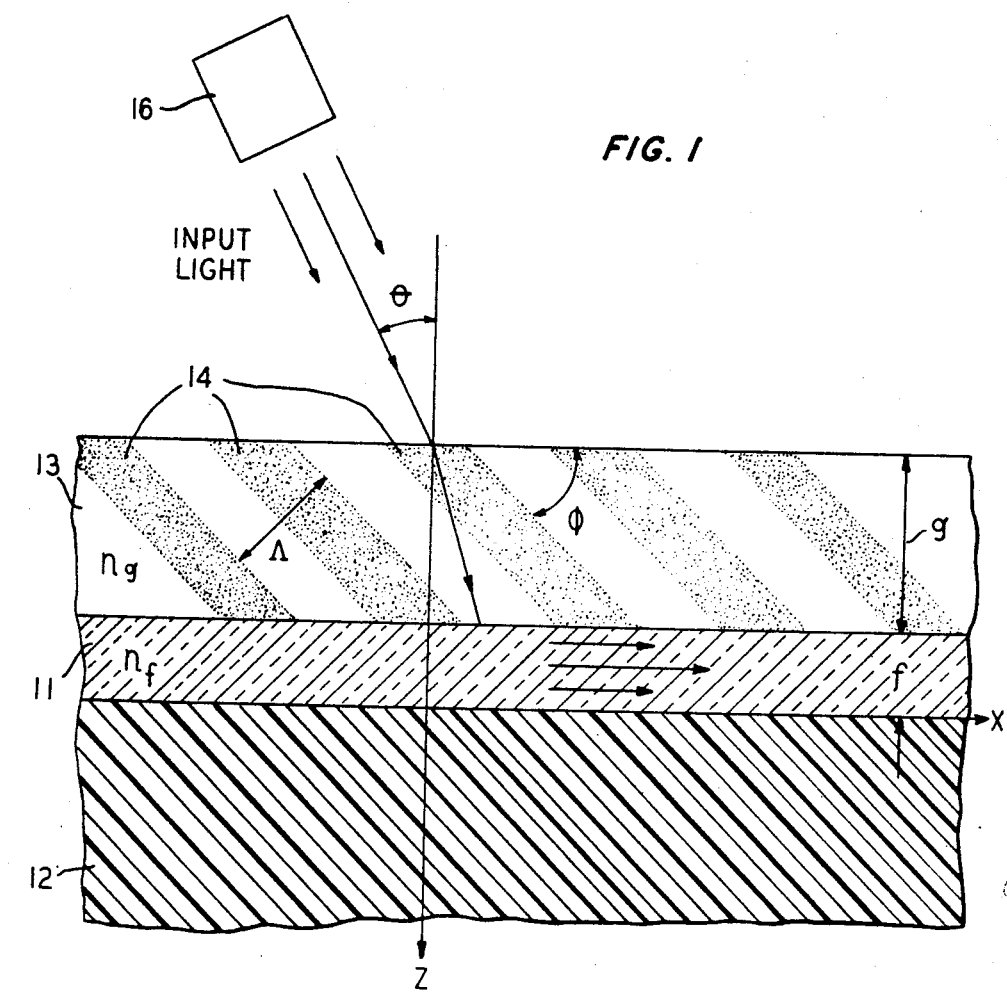
FIG. 1 is a sectional view of an illustrative embodiment of the invention.

In FIG. 1 there is shown a sectional view of a light coupling arrangement embodying the principles of the present invention in a Bragg type coupler.

An optical waveguide member 11 of suitable material such as, for example, glass, is deposited upon a supporting substrate 12 of material such as, for example, Plexiglas, by sputtering or other suitable deposition techniques. A grating coupler 13 of suitable holographic material such as, for example, dichromated gelatin, is deposited directly upon the film 11. The material of member 13 is chosen to have an index of refraction $n_g$ such that $$n_t > n_g \tag{1}$$

where $n_t$ is the index of refraction of the material of the light guiding film 11.

Member 13 has formed therein, by holographic techniques to be explained more fully hereinafter, a plurality of fringe planes 14 having a spacing $\Lambda$ and oriented at an angle $\phi$ to the surface of member 13. The grating thus formed is characterized by a grating vector K oriented perpendicularly to the fringe planes 14 and having a magnitude given by $$K = \frac{2\pi}{\Lambda} \tag{2}$$

Light to be coupled into the film 11 is directed into grating 13 from a suitable source 16 at an angle $\theta$ to the vertical, as shown in FIG. 1. The light has a free space propagation vector given by.

$$k_o = \frac{2\pi}{\lambda} \quad (3)$$

where $\lambda$ is the wavelength of the light in free space. Within the grating 13 the propagation vector of the light becomes $$\underline{k_g} = n_g k_o \quad (4)$$

Fringe planes 14, or, more appropriately, the Bragg planes, which are, in actuality, regions of the equal index of refraction of a spatially varying index in the material of member 13 produce a diffraction of the light which results in a diffracted wave having a propagation vector given by $(\underline{k_g} + K)$. In order for coupling to occur, this diffracted light propagation vector must have a component in hte $\underline{x}$ direction, as seen in FIG. 1 that matches the propagation constant $\beta$ of the desired film mode, that is $$\beta = (\underline{k_g} + K)x \quad (5)$$

When the light from source 16 is incident at or near the Bragg angle, that is, when $$\cos(\phi - \theta_g) = \frac{K}{2n_g k_o} \quad (6)$$

where $\theta_g$ is the angle of incidence with respect to the vertical within the grating 13, substantially all of the incident light is diffracted in one diffraction order, the other orders being substantially completely suppressed. Unfortunately, the Bragg condition and the coupling condition, as given by Equations 6 and 5 respectively, cannot both be satisfied for the same angle of incidence of the light.

Figure 2:
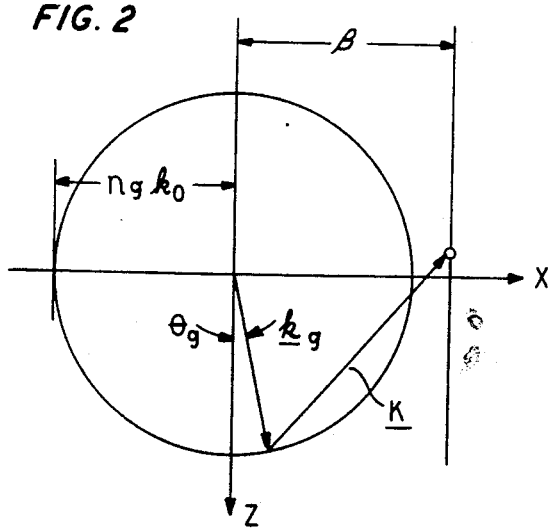
FIG. 2 is a vector diagram illustrating certain relationships of the arrangement of FIG. 1.

FIG. 2 is a vector diagram for the Bragg coupler of FIG. 1. The circle of radius $n_g k_o$ is the locus of $k_g$ vectors for different values of the angle of incidence $\theta_g$. The vertical line spaced a distance $\beta$ from the Z axis is the matching line, i.e., the line defining phase matching of the light with a propagation mode of the guide 11. Phase matching occurs when Equation 5 is satisfied, which means the vector sum $(k_g + K)$ terminates on the vertical matching line. On the other hand, from Equation 6 it is implied that the Bragg condition is met when the vector sum $(k_g + K)$ terminates on the $n_g k_o$ circle. From FIG. 2 it is clear that the Bragg condition and the phase match condition cannot both be met from the same angle of incidence. However, it can be shown that there is a minimum possible difference $\Delta\theta_{g\ min}$ between the Bragg angle and the phase matching angle which is approximately $$\Delta\theta_{g\ min} \approx (n_t - n_g)/n_g \quad (7)$$

where it is assumed that the "detuning" angle is small and that $$\beta \approx n_t k_o \quad (8)$$

Typically this "detuning" angle is only a few degrees of arc. To take advantage of Bragg effects the matching angle should be as close as possible to the Bragg angle, and preferably, although not necessarily, within the half power width of the Bragg response, which is approximated by $A/g$ where $g$ is the thickness of the grating 13. Thus it can be said that the Bragg condition, as given by Equation 6 is approximately satisfied, within the limits of Equations 7 and 8 for most efficient operation of the coupler.

In an embodiment of the coupler of FIG. 1 designed for use at an optical wavelength of 6328 A., and with the incident angle being perpendicular to the surface of the coupler ($\theta = 0°$), the optimum value of angle $\phi$ is approximately 45° and the optimum value of $\Lambda$ is approximately 0.25 $\mu$m. (4000 lines/mm.). This fringe pattern is produced holographically in dichromated gelatin for example, by exposing the sensitized gelatin, which has been previously deposited on the light guiding film by suitable techniques, to two collimated light beams of 4416 A. wavelength. The light beams are introduced into the gelatin at different angles to produce an interference pattern in the gelatin which satisfies the aforementioned requirements. The gelatin layer is typically 4 $\mu$m. thick and the light guiding film is typically 0.3 $\mu$m. thick, with a refractive index of $n_t = 1.62$. It is conceivable that other techniques, e.g., liquid crystals, may be used to produce a thick Bragg type grating. Holographic techniques, however, are, in the present state of the art one of the most practical ways of making such gratings.

With such an arrangement, coupling is achieved either by transmission through the grating, as depicted in FIG. 1, or reflection from the grating, in which case the light to be coupled is introduced through the substrate side of the coupler. In the latter case there is some loss of light due to the less than perfect transmittance of the substrate and film. However, with optimum angles of incidence and beam characteristics, e.g. beam diameter, 70% or more of the incident light can be coupled into the guide, with a grating approximately 5 mm. long.

Because of the differences in indices of refraction of the grating and the guide, the light from the grating does not directly enter the guide. At the junction between the guide and the grating there is an evanescent wave of the light guide mode with which the horizontal component of the diffracted light is matched as to propagation constant and hence interacts therewith to produce a growing wave in the guide. Because there is a cumulative phase shift modulation of the light within the Bragg type coupler, strong coupling is achieved over relatively short coupling lengths.

The discussion thus far has dealt with Bragg type thick hologram couplers. Holographic techniques also make it possible to create diffraction gratings having a very large number of lines or fringes in a given length, considerably in excess of the number of lines possible with conventional etching techniques. This results in such a large diffraction angle that only one diffraction order can propagate, all other orders being beyond cutoff. This large diffraction angle results in a thin film waveguide mode which travels in a direction reverse to that of the incident light.

The embodiment of FIG. 1 comprises a thick Bragg type grating deposited on one surface of the light guide. It is possible that the Bragg type grating might be incorporated into the light guide itself, although such a structure would depend upon the use of different techniques and materials. However, the principles of the present invention are equally applicable to such an arrangement.

The foregoing discussion has been for purposes of illustrating the principles of the invention. Numerous other embodiments may occur to workers in the art utilizing these principles and hence falling within the spirit and scope of the invention.

What is claimed is:
1. A light wave coupling arrangement comprising an optical waveguiding member of material having an index of refraction $n_t$ and having opposed surfaces, a thick Bragg type optical grating of material having an index of refraction $n_g$, where $n_t > n_g$, extending along one surface of said waveguiding member, said grating having a plurality of fringe planes therein having a spacing $\Lambda$ and oriented at an angle $\phi$ to a surface of said grating and means for directing light of wavelength $\lambda$ to be coupled into said grating in a direction such that the relationship

$$\cos(\phi - \theta_g) = \frac{K}{2n_g k_o}$$

where $\theta_g$ is the angle of the light relative to the normal of the surface of the grating, K is the grating vector defined as $$K = \frac{2\pi}{\Lambda}$$

and $k_o$ is the free space propagation vector of the light, given by $$k_o = \frac{2\pi}{\lambda}$$

is approximately satisfied, said fringe planes being formed by regions of equal index of refraction within the material of the grating.

2. A light wave coupling arrangement comprising an optical waveguiding member of material having an index of refraction $n_t$ and having opposed surfaces, and a thick Bragg type optical grating of material having an index of refraction $n_g$, where $n_t > n_g$, extending along said waveguiding member on one surface thereof in the direction of wave propagation, said Bragg type grating having a spatially varying index of refraction within the material and a plurality of substantially equally spaced Bragg planes disposed at an angle to said one surface, said planes being formed by regions of equal index of refraction within the spatially varying index of refraction of the grating.

3. A light wave coupling arrangement as claimed in claim 2 and further including means for directing light to be coupled into said grating at an angle such that unwanted grating orders are substantially suppressed.

4. A light wave coupling arrangement as claimed in claim 2 wherein said Bragg type grating comprises a member of holographic material.

5. A light wave coupling arrangements as claimed in claim 4 wherein said holographic material is dichromated gelatin.

References Cited
UNITED STATES PATENTS

| | | | |
|---|---|---|---|
| 3,489,481 | 1/1970 | Osterberg et al. | |
| | | | 350—96 WG UX |
| 3,507,564 | 4/1970 | Franks | 350—162 X |
| 3,403,955 | 10/1968 | Jueneman | 350—96 |
| 3,471,214 | 10/1969 | Polanyi | 350—96 |

OTHER REFERENCES

Sheridon: "Production of Blazed Holograms," Applied Physics Letters, vol. 12, No. 9, May 1968, pp. 316–318.

Dakss et al.: "Grating Coupler for Efficient Excitation of Optical Guided Waves in Thin Films," Applied Physics Letters, vol. 16, No. 12, June 1970, pp. 523–525.

JOHN K. CORBIN, Primary Examiner

U.S. Cl. X.R.

350—3.5, 162 R